(12) United States Patent
Janson et al.

(10) Patent No.: US 7,083,540 B2
(45) Date of Patent: Aug. 1, 2006

(54) DUAL CLUTCH TRANSMISSION HAVING LOW GEAR MESH LOSS

(75) Inventors: David Janson, Plymouth, MI (US); Reid Baldwin, Howell, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 42 days.

(21) Appl. No.: 10/803,514

(22) Filed: Mar. 18, 2004

(65) Prior Publication Data

US 2005/0209042 A1   Sep. 22, 2005

(51) Int. Cl.
F16H 37/02   (2006.01)
F16H 3/08    (2006.01)

(52) U.S. Cl. .................. 475/211; 475/215; 475/218

(58) Field of Classification Search ........ 475/207–219; 74/325, 329–336, 340
See application file for complete search history.

(56) References Cited

U.S. PATENT DOCUMENTS

| | | | | |
|---|---|---|---|---|
| 2,972,899 A | * | 2/1961 | Wiggermann | 74/329 |
| 3,362,245 A | * | 1/1968 | Welch, Jr. et al. | 74/359 |
| 3,884,097 A | | 5/1975 | Avramidis et al. | |
| 5,458,014 A | * | 10/1995 | Thomas et al. | 74/325 |
| 5,591,097 A | * | 1/1997 | Petri et al. | 475/207 |
| 5,823,051 A | * | 10/1998 | Hall, III | 74/325 |
| 6,698,303 B1 | * | 3/2004 | Hoffmann et al. | 74/337.5 |
| 7,004,878 B1 | * | 2/2006 | Gumpoltsberger et al. | 475/218 |
| 7,021,168 B1 | * | 4/2006 | Burkle et al. | 74/325 |
| 2003/0199353 A1 | | 10/2003 | Bowen | |

FOREIGN PATENT DOCUMENTS

| | | |
|---|---|---|
| EP | 1249361 | 10/2002 |
| GB | 1321522 | 6/1973 |
| GB | 2081824 | 2/1982 |
| WO | WO 03/033939 | 4/2003 |

\* cited by examiner

*Primary Examiner*—Tisha Lewis
(74) *Attorney, Agent, or Firm*—David B. Kelley; MacMillian, Sobanski & Todd

(57) ABSTRACT

A power transmission for a motor vehicle In realizing these advantages, a power transmission according to this invention includes an input shaft, an output, and a layshaft disposed parallel to the input shaft. A pair of drive elements includes a first element secured to the input shaft, and a second element journalled on the layshaft and driveably connected to the first element. A first coupler is secured to the layshaft for releasably coupling the second element and the layshaft. A planetary gear unit driveably connecting the layshaft and the output, incldies a sun gear secured to the layshaft, a ring gear surrounding the sun gear and fixed against rotation, a carrier driveably connected to the output, and a set of planet pinions meshing with the sun gear and ring gear and rotatably supported on the carrier.

20 Claims, 4 Drawing Sheets

|    |     | Number of Teeth |
|----|-----|-----------------|
| 28 | G1  | 89 |
| 30 | G2  | 53 |
| 32 | G3  | 47 |
| 22 | G4  | 25 |
| 24 | G5  | 47 |
| 26 | G6  | 16 |
| 34 | G7  | 65 |
| 36 | G8  | 66 |
| 40 | G9  | 30 |
| 42 | G10 | 31 |
| 44 | G11 | 43 |
| 46 | G12 | 29 |
| 52 | Sun | 22 |
| 58 | Pinion | 25 |
| 54 | Ring | 72 |

Figure 2

|     | Torque Ratio | Step   |
|-----|--------------|--------|
| 1st | 5.321        |        |
| 2nd | 3.909        | 1.361  |
| 3rd | 2.727        | 1.433  |
| 4th | 1.813        | 1.505  |
| 5th | 1.245        | 1.455  |
| 6th | 0.915        | 1.361  |
| 7th | 0.730        | 1.253  |
| Rev | -5.298       | -0.996 |

Figure 3

|  |  | Number of Teeth |
|---|---|---|
| 100 | G1 | 25 |
| 102 | G2 | 31 |
| 70 | SP1 | 26 |
| 72 | SP2 | 16 |
| 74 | SP3 | 33 |
| 76 | SP4 | 23 |
| 78 | SP5 | 16 |
| 82 | SP6 | 19 |
| 86 | SP7 | 20 |
| 90 | SP8 | 21 |
| 94 | SP9 | 21 |
| 98 | SP10 | 29 |
| 52 | Sun | 22 |
| 58 | Pinion | 25 |
| 54 | Ring | 72 |

*Figure 5*

|  | Torque Ratio | Step |
|---|---|---|
| 1st | 5.341 |  |
| 2nd | 3.901 | 1.369 |
| 3rd | 2.719 | 1.435 |
| 4th | 1.813 | 1.500 |
| 5th | 1.250 | 1.450 |
| 6th | 0.913 | 1.369 |
| 7th | 0.731 | 1.249 |
| Rev | -5.298 | -0.992 |

*Figure 6*

DUAL CLUTCH TRANSMISSION HAVING LOW GEAR MESH LOSS

BACKGROUND OF THE INVENTION

1. Field of the Invention

This invention relates to automatic transmissions having a layshaft kinematic arrangement, particularly to such transmissions having input clutches but no torque converter.

2. Description of the Prior Art

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open hydraulic friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio, and then restoring torque. A primary functional feature of ASM transmissions is the need to interrupt power transmitted from the engine to the transmission input shaft before or during each gear ratio change because there is no torque converter or producing a hydrokinetic connection between the engine and transmission input.

Dual clutch layshaft transmissions are essentially two ASM transmissions, one providing odd numbered gears and one providing even numbered gears. Shifts between odd numbered gears and even numbered gears can be accomplished without interrupting power flow. While operating in an odd numbered gear, the couplers can be moved to configure the transmission for the next even numbered gear. Dual clutch transmissions have parasitic losses only slightly higher than ASM transmissions.

Layshaft ASM transmissions offer significant efficiency improvements over traditional automatic transmissions with torque converters. However, ASMs must produce more torque multiplication in the lower gears than would be required of a transmission having a torque converter in order to compensate for the torque multiplication that a torque converter produces at lower speeds. Layshaft ASM transmissions must produce more torque multiplication in the lower gears also to avoid excessive energy into the clutch during launch of a vehicle from a stop condition.

A transmission having a large span usually requires many gear ratios to keep the ratio steps small. Consequently, there are many gears and synchronizer or couplers in large span transmissions.

SUMMARY OF THE INVENTION

This invention reduces the magnitude of gear mesh losses to a much lower magnitude than is present in a conventional ASM transmission. A transmission according to this invention uses only one gear mesh for the high gears, thereby keeping gear mesh loss to a minimum. A planetary gear unit is used to produce additional torque multiplication in the low gears. Furthermore, this transmission reuses some of the pinion-gear meshes to produce multiple gears, resulting in a low number of gears for the number of speed ratios produced.

In one embodiment, the direction of output rotation is opposite that of the input. In a conventional rear wheel drive application, this would require changes to a conventional inter-wheel differential mechanism. However, this requirement is avoided in a second embodiment, in which sprocket wheels and chains replace the pinions and gears.

Because a layshaft ASM transmission must provide a large torque multiplication in first gear, the distance between the main shaft and layshaft, called "center distance," is usually large and requires a correspondingly large package size. Here, however, much of the torque multiplication is achieved near the output end of the transmission by a planetary gear unit, the other components carry relatively low torque loads, and the center distance is kept small. Therefore, the package size is compact.

Gear ratio changes are accomplished through the use of couplers, such as synchronizers or dog clutches, which mutually driveably connect components operative in each speed ratio. The couplers produce very little drag loss when engaged, and do not require a continuous supply of power to stay engaged.

In realizing these advantages, a power transmission according to this invention includes an input, first input shaft and second input shaft arranged coaxially with a first axis. An output and layshaft are arranged coaxially on a second axis. A first clutch alternately connects and disconnects the input and the first input shaft. A second clutch alternately connects and disconnects the input and the second input shaft. A first torque path driveably connecting the first and second input shafts to the layshaft. A second torque path driveably connects the second input shaft and the output. A third torque path, which includes a planetary gear unit, produces a speed reduction between the layshaft and the output.

In realizing these advantages, a power transmission according to this invention includes an input shaft, an output, and a layshaft disposed parallel to the input shaft. A pair of drive elements includes a first element secured to the input shaft, and a second element journalled on the layshaft and driveably connected to the first element. A first coupler is secured to the layshaft for releasably coupling the second element and the layshaft. A planetary gear unit driveably connecting the layshaft and the output, includies a sun gear secured to the layshaft, a ring gear surrounding the sun gear and fixed against rotation, a carrier driveably connected to the output, and a set of planet pinions meshing with the sun gear and ring gear and rotatably supported on the carrier.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a chart containing an example of the number of teeth for each of the gears and pinions of the transmission shown in FIG. 1;

FIG. 3 is a chart containing the torque ratios between the input and output and steps between the torque ratios for each of the forward gears and the reverse gear of the transmission of FIG. 1, the gears and pinions having the number of teeth shown in FIG. 2;

FIG. 5 is a chart containing an example of the number of teeth for each of the sprockets, gears and pinions of the transmission shown in FIG. 4; and FIG. 6 is a chart containing the torque ratios between the input and output and steps between the torque ratios for each of the forward gears and the reverse gear of the transmission of FIG. 4, the sprockets, gears and pinions having the number of teeth shown in FIG. 5.

DETAILED DESCRIPTION OF THE PREFERRED EMBODIMENT

Figure 1:
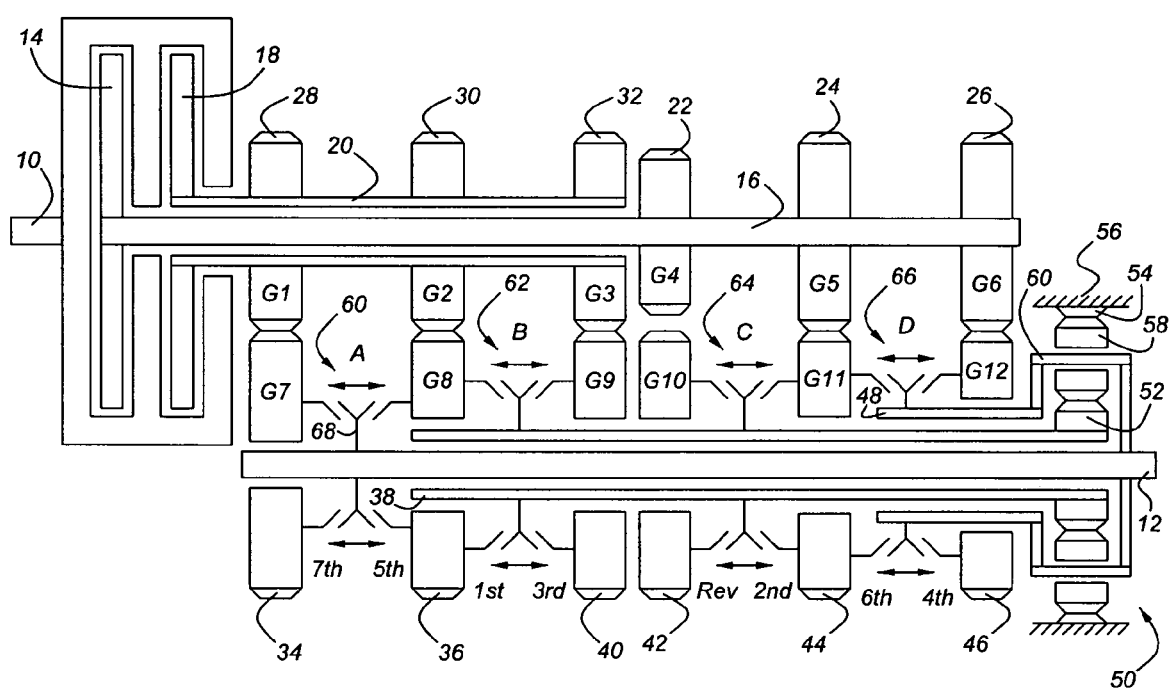
FIG. 1 is a schematic diagram showing a gear arrangement of the transmission according to the present invention.

Referring now to FIG. 1, a transmission according to the present invention includes an input 10 for driveably connecting a power source such as an internal combustion engine or electric motor to the transmission, and an output 12 for driving a load, such as the driven wheels of a motor vehicle, through a powertrain that may include a drive shaft, differential mechanism, and axle shafts.

A first friction clutch 14 alternately connects and disconnects a first input shaft 16 as the clutch is engaged and disengaged, respectively. A second friction clutch 18 alternately connects and disconnects a second input shaft 20 as the clutch is engaged and disengaged, respectively.

Pinions 22, 24, 26 are secured to input shaft 16, which is supported for rotation on a transmission case. Pinions 28, 30, and 32 are secured to the second input shaft 20. Pinion 28 is in continuous meshing engagement with gear 34, which is journalled on output 12. Pinion 30 is in continuous meshing engagement with gear 36, which is journalled on layshaft 38. Pinion 32 is in continuous meshing engagement with gear 40, which is journalled on layshaft 38. Pinion 24 is in continuous meshing engagement with gear 44, which is journalled on layshaft 38. Pinion 26 is in continuous meshing engagement with gear 46, which is journalled on a second layshaft 48. Reverse pinion 22 is continuously driveably connected to an idler gear (not shown), which in turn is in continuous meshing engagement with reverse gear 42, journalled on layshaft 38.

A planetary gear unit 50, preferably located near the output end of output 12, includes a sun gear 52 secured to the layshaft 38, a ring gear 54 secured to a transmission case 56 and held there against rotation, a set of planet pinions 58 in continuous meshing engagement with sun gear 52 and ring gear 56, and a carrier 60 driveably connected to the second layshaft 48 and output 12 and rotatably supported the planet pinion 58. When the transmission being described here is operating in the first, second and third forward gear ratios, and in reverse drive, the planetary gear unit 50 produces a speed reduction and torque increase at output 12 relative to the speed of, and torque transmitted by layshaft 38. As described here, the planetary gear unit is not included in the torque delivery path for fourth, fifth, sixth and seventh forward gear ratios.

Couplers 60, 62, 64 and 66 are preferably synchronizers of the type used in automotive manual transmissions to connect a gear or pinion to a shaft, after synchronizing the speed of the shaft and that of the pinion or gear. Each coupler may also disconnect the shaft and the associated pinion or gear. An example of such a synchronizer is disclosed in U.S. Pat. No. 4,222,281. Alternatively, each coupler may be a toothed clutch having dogteeth that are engaged with clutch teeth on a gear or pinion. This invention may use couplers in any combination of synchronizers and dog clutches. Each coupler is secured by a hub to the output 12 or a layshaft 38, 48. For example, coupler 60 is secured by hub 68 to output 12 for rotation with the output.

In the case where a coupler is a synchronizer, it is provided with a conical surface, which engages mutually with a corresponding conical surface located on a gear or sprocket adjacent the synchronizer. When coupler 60 is engaging either of its adjacent gears 34, 36 or sprockets 82, 86, these conical surfaces are forced together into frictional contact, and that frictional engagement synchronizes the speed of the gear or sprocket to that of the output 12. Each synchronizer is equipped with a sleeve 70 supported on the hub 68 for sliding movement leftward and rightward into engagement with the conical surfaces and dog teeth carried on the adjacent gear and sprocket. When the dog teeth of the sleeve engage those of the gear or sprocket, the layshaft is driveably connected to the gear or sprocket.

In the case where a coupler is a dog clutch, displacement of the sleeve 70 in opposite axial directions causes mutual engagement of dog teeth formed on the sleeve with dog teeth carried on the gear and sprocket, such that a drive connection is made between the layshaft and the gear or sprocket, but without first synchronizing the rotational speed of the layshaft with the speed of the gear or sprocket.

Figure 4:
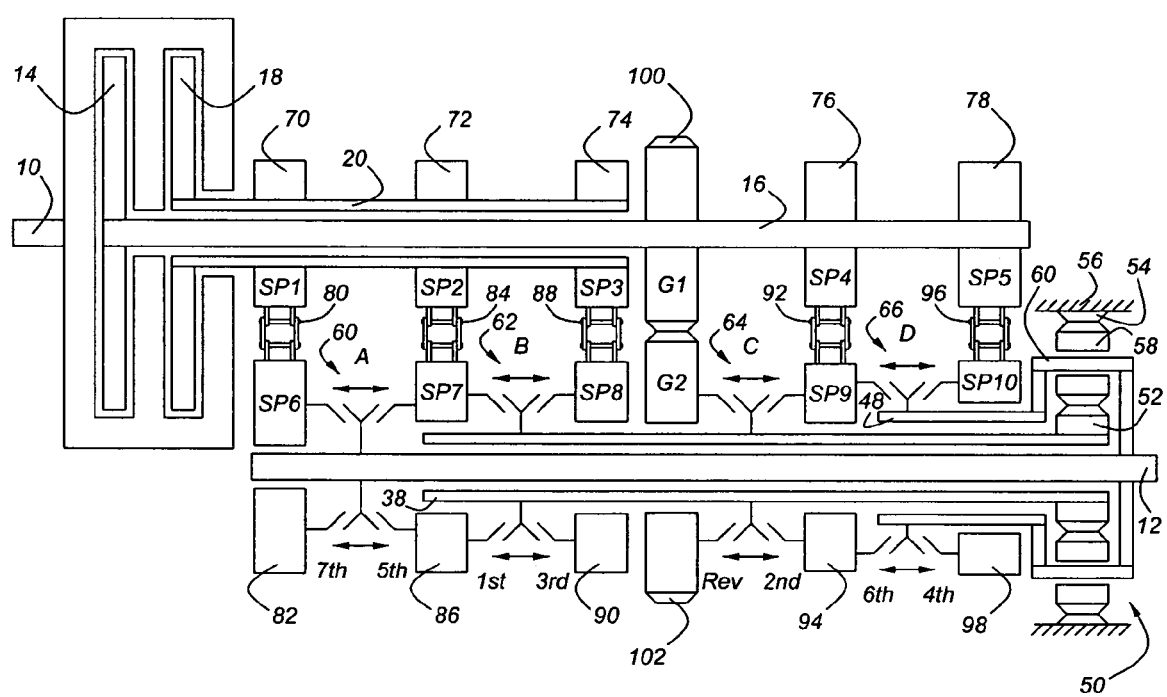
FIG. 4 is a schematic diagram showing a kinematic arrangement of the transmission according to the present invention.

In FIGS. 1 and 4, the couplers 60–66 are shown in a neutral position, between the left-hand and right-hand extremities of travel of the connecting sleeve, whose engagement with dog teeth carried on the gear and sprocket completes the drive connection to the output 12 or layshaft 38, 48. The hubs of couplers 62, 64 are rotatably secured to layshaft 38; the hub of coupler 66 is rotatably secured to layshaft 48; and the hub of coupler 60 is secured to output 12.

Coupler 60, located between gears 34, 36 and between sprockets 82, 86, releasably connects alternately those gears and sprockets to output 12, and coupler 60 may be disengaged from both gears and both sprockets. Coupler 62, located between gears 36, 40 and between sprockets 86, 90 releasably connects alternately those gears and sprockets to layshaft 38, and coupler 62 may be disengaged from both gears and both sprockets. Coupler 64, located between gears 42, 44 and between sprockets 102, 94, releasably connects alternately those gears and sprockets to layshaft 38, and coupler 64 may be disengaged from both gears and both sprockets. Coupler 66, located between gears 44, 46 and between sprockets 94, 98, releasably connects alternately those gears and sprockets to layshaft 48, and coupler 66 may be disengaged from both gears and both sprockets.

Operation of the transmission will be discussed next with reference to the positional state of the coupler sleeves and the applied and released state of clutches 14 and 18. The first forward gear ratio is produced by first moving the selector sleeve of coupler 62 leftward to connect gear 36 to layshaft 38, and then engaging friction clutch 18. The speed of gear 36 is reduced and the torque it transmits is increased relative to those of the input 10. A second torque multiplication occurs in the planetary gear unit 50, where sun gear 52 is driven by layshaft 38, ring gear 54 provides a torque reaction, and the carrier 60 is the output that drives output 12. The output 12 is driven at a torque ratio of 5.321, and the torque ratio produced by planetary gear unit 50 is about 4.273 using the gear and pinion sizes of FIG. 2.

The transmission is prepared for an upshift to the second ratio from the first forward ratio by moving the sleeve of coupler 64 rightward to connect gear 44 to layshaft 38. Disengaging clutch 18, engaging clutch 14 and returning the sleeve of coupler 62 to the neutral position complete the upshift. These actions produce a first speed reduction due to the engagement of pinion 24 and gear 44, such that layshaft 38 and sun gear 52 are driven at a slower speed and higher torque relative to those of input 10. An additional speed reduction and torque multiplication occurs at the planetary gear unit 50. The output 12 is driven at a torque ratio of 3.909.

The transmission is prepared for an upshift to the third ratio from the second ratio by moving the sleeve of coupler 62 rightward to connect gear 40 to layshaft 38. Then disengaging clutch 14, engaging clutch 18 and returning the sleeve of coupler 64 to the neutral position complete the upshift. These actions produce a first speed reduction due to the engagement of pinion 32 and gear 40, such that layshaft 38 and sun gear 52 are driven at a slower speed and higher torque relative to those of input 10. An additional speed reduction and torque multiplication occurs at the planetary gear unit 50. The output 12 is driven at a torque ratio of 2.719.

The transmission is prepared for an upshift to the fourth speed ratio by moving the selector sleeve of coupler 66 rightward to driveably connect gear 46 to second layshaft 48. Then disengaging clutch 18, engaging clutch 14, and returning the sleeve of coupler 62 to the neutral position complete the upshift. Layshaft 48, carrier 60, and output 12 are driven at a lower speed than that of input 10 due to the meshing engagement of pinion 26 and gear 46. The output 12 is driven at a ratio of 1.813.

The transmission is prepared for an upshift to the fifth speed ratio by moving the selector sleeve of coupler 60 rightward to driveably connect gear 36 to layshaft 38. Then engaging clutch 18, disengaging clutch 14, and returning the sleeve of coupler 66 to the neutral position complete the upshift. Output 12 is driven at a lower speed than that of input 10 due to the meshing engagement of pinions 30 and gear 36. The output 12 is driven at a ratio of 1.245.

The transmission is prepared for an upshift to the sixth speed ratio by moving the selector sleeve of coupler 66 leftward to driveably connect gear 44 to second layshaft 48. Then disengaging clutch 18, engaging clutch 14, and returning the sleeve of coupler 60 to the neutral position complete the upshift. Layshaft 48, carrier 60, and output 12 are driven at a higher speed than that of input 10 due to the meshing engagement of pinion 24 and gear 44. The output 12 is driven at a ratio of 0.915.

The transmission is prepared for an upshift to seventh speed ratio by moving the selector sleeve of coupler 60 left to driveably connect gear 34 to output 12. Then engaging clutch 18, disengaging clutch 14, and returning the sleeve of coupler 66 to the neutral position complete the upshift. Output 12 is driven at a higher speed than that of input 10 due to the meshing engagement of pinion 28 and gear 34. The output 12 is driven at a ratio of 0.730.

The transmission is prepared for a shift from the first forward speed ratio to the reverse drive by disengaging clutch 14 moving the selector sleeve of coupler 62 to the neutral position and moving the selector sleeve of coupler 64 leftward to driveably connect reverse output gear 42 to layshaft 38. Then clutch 18 is engaged. The first speed reduction occurs due to the drive connection between pinion 22 and gear 42, which is driveably connected through coupler 64 and layshaft 38 to sun gear 52. A second speed reduction is produced in the planetary gear unit such that output 12 is driven by carrier 60 at a slower speed and higher torque than those of input 10. The output 12 is driven at a ratio of −5.298.

Because the direction of rotation of output 12 is opposite to the direction of input 10 in the arrangement of FIG. 1, sprocket wheels 70, 72 and 74, secured to input shaft 20, replace pinions 28, 30 and 32; and sprocket wheels 76, 78, secured to input shaft 16, replace pinions 76 and 78, in the embodiment of FIG. 4. A chain 80 driveably connects sprocket 70 to sprocket wheel 82, which journalled on output 12. A chain 84 driveably connects sprocket wheel 86, which is journalled on layshaft 38, to sprocket 72. A chain 88 driveably connects a sprocket wheel 90, which is journalled on layshaft 38, to sprocket wheel 74. Chain 92 driveably connects sprocket 76 to sprocket wheel 94, which is journalled on layshaft 38. Chain 96 driveably connects sprocket 78 to sprocket wheel 98, which is journalled on layshaft 48. A reverse pinion 100 is in continuous meshing engagement with a reverse output gear 102, journalled on layshaft 38.

Each of the forward drive and reverse drive gears of the arrangement of FIG. 4 is produced by operating the clutches 14, 18 and the couplers 60–66 in the same way as described with reference to FIG. 1.

The planetary gear unit operates with three concentric shafts on the output 12 axis. The inner and outer shafts 12, 48, respectively, are directly connected to the output. The middle shaft 38 is connected to the planetary sun gear 52, resulting in torque multiplication at the output. By alternately connecting one of the driven gears to either the middle shaft or the inner shaft, first and fifth gears are produced. Similarly, by alternatively connecting another driven gear to either the middle shaft or the outer shaft, second and sixth gears are produced.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed power transmission, comprising:
   an input shaft;
   a layshaft disposed parallel to the input shaft;
   a pair of drive elements including a first element secured to the input shaft, and a second element journalled on the layshaft and driveably connected to the first element;
   a first coupler secured to the layshaft for releasably coupling the second element and the layshaft;
   an output;
   a planetary gear unit driveably connecting the layshaft and the output, including a sun gear secured to the layshaft, a ring gear surrounding the sun gear and fixed against rotation, a carrier driveably connected to the output, and a set of planet pinions meshing with the sun gear and ring gear and rotatably supported on the carrier;
   an input;
   a second input shaft;
   a clutch driveably connected to the input and input shaft, for alternately connecting and disconnecting the input and the input shaft;
   a second clutch driveably connected to the input and second input shaft, for alternately connecting and disconnecting the input and the second input shaft; and
   a second pair of drive elements including a third element secured to the second input shaft, and a fourth element journalled on the layshaft and driveably connected to the third element; and
   a second coupler secured to the layshaft for releasably coupling the fourth element and the layshaft.

2. The transmission of claim 1, further comprising:
   a third pair of drive elements including a fifth element secured to the second input shaft, and a sixth element driveably connected to the fifth element; and wherein the second coupler releasably couples the sixth element and the layshaft.

3. The transmission of claim 1, further comprising:
a third pair of drive elements including a fifth element secured to the second input shaft, and a sixth element driveably connected to the fifth element, wherein the second coupler releasably couples the fifth element and the layshaft; and
a third coupler secured to the output for releasably coupling the sixth element and the output.

4. The transmission of claim 1, further comprising:
a second layshaft disposed parallel to the input shaft and driveably connected to the carrier;
a fourth pair of drive elements including a seventh element secured to the input shaft, and an eighth element journalled on the second layshaft and driveably connected to the seventh element; and
a fourth coupler secured to the second layshaft, for releasably coupling the eight element to the second layshaft and the second element to the second layshaft.

5. The transmission of claim 1, further comprising:
a second layshaft disposed parallel to the input shaft and driveably connected to the output;
a fourth coupler secured to the second layshaft, for releasably coupling the second element to the output.

6. The transmission of claim 1, wherein the second input shaft is arranged coaxially with the input and the input shaft.

7. The transmission of claim 2, wherein the second input shaft is arranged coaxially with the input and the input shaft.

8. The transmission of claim 3, wherein each of the first, second and third pairs of drive elements includes a pinion and a gear in meshing engagement with the corresponding pinion.

9. The transmission of claim 3, wherein each of the first, second and third pairs of drive elements includes a first sprocket wheel, a second sprocket wheel, and a chain driveably engaged with the first sprocket wheel and the second sprocket wheel.

10. The transmission of claim 4, wherein the fourth pair of drive elements includes a pinion and a gear in meshing engagement with the corresponding pinion.

11. The transmission of claim 4, wherein the fourth pair of drive elements includes a first sprocket wheel, a second sprocket wheel, and a chain driveably engaged with the first sprocket wheel and the second sprocket wheel.

12. A multiple speed power transmission, comprising:
an input, first input shaft and second input shaft arranged coaxially on a first axis;
an output and layshaft arranged coaxially on a second axis;
a first clutch for alternately connecting and disconnecting the input and the first input shaft;
a second clutch for alternately connecting and disconnecting the input and the second input shaft;
a first torque transmitting path for driveably connecting the layshaft to the first input shaft;
a second torque transmitting path for driveably connecting the layshaft to the second input shaft;
a third torque transmitting path for driveably connecting the first and second input shafts to the output; and
a fourth torque transmitting path including a planetary gear unit producing a speed reduction between the layshaft and the output.

13. The transmission of claim 12, wherein a first torque transmitting path includes:
a first pair of drive elements including a first element secured to the first input shaft, and a second element journalled on the second axis and driveably connected to the first element;
a first coupler secured to the layshaft for releasably coupling the second element and the layshaft.

14. The transmission of claim 12, wherein a second torque transmitting path includes:
a second pair of drive elements including a third element secured to the second input shaft, and a fourth element journalled at the second axis and driveably connected to the third element; and
a second coupler secured to the layshaft for releasably coupling the fourth element and the layshaft.

15. The transmission of claim 12, wherein second torque transmitting paths include:
a second pair of drive elements including a third element secured to the second input shaft, and a fourth element journalled at the second axis and driveably connected to the third element; and
a third pair of drive elements including a fifth element secured to the second input shaft, and a sixth element journalled at the second axis and driveably connected to the fifth element; and
a second coupler secured to the layshaft for alternately releasably coupling the fourth element and the sixth element to the layshaft.

16. The transmission of claim 12, wherein:
a first torque transmitting path includes a first pair of drive elements including a first element secured to the first input shaft, and a second element journalled at the second axis and driveably connected to the first element; and a first coupler secured to the layshaft for releasably coupling the second element and the layshaft; and
second torque transmitting paths include a second pair of drive elements including a third element secured to the second input shaft, and a fourth element journalled at the second axis and driveably connected to the third element; a third pair of drive elements including a fifth element secured to the second input shaft, and a sixth element journalled at the second axis and driveably connected to the fifth element; and a second coupler secured to the layshaft for releasably coupling the fourth element and sixth element to the layshaft.

17. The transmission of claim 12, wherein a third torque transmitting path includes:
a third pair of drive elements including a fifth element secured to the second input shaft, and a sixth element journalled at the second axis and driveably connected to the fifth element; and
a third coupler secured to the output for releasably coupling the sixth element and the output.

18. The transmission of claim 16, wherein each of the first, second and third pairs of drive elements includes pinion and a gear in meshing engagement with the pinion.

19. The transmission of claim 16, wherein each of the first, second and third pairs of drive elements includes a first sprocket wheel, a second sprocket wheel, and a chain driveably engaged with the first sprocket wheel and the second sprocket wheel.

20. The transmission of claim 12, wherein the planetary gear includes:
a sun gear secured to the layshaft;
a ring gear surrounding the sun gear and fixed against rotation; and
a carrier driveably connected to the output; and
a set of planet pinions rotatably supported on the carrier and in meshing engagement with the sun gear and ring gear.

* * * * *